United States Patent
Schlick

[11] Patent Number: 5,975,023
[45] Date of Patent: Nov. 2, 1999

[54] BIRD SLEEPER

[76] Inventor: Benjamin J. Schlick, 10693 Van Gordon Way, Broomfield, Colo. 80021

[21] Appl. No.: 08/622,376

[22] Filed: Mar. 27, 1996

[51] Int. Cl.[6] .................................................. A01K 29/00
[52] U.S. Cl. ............................................................ 119/467
[58] Field of Search ..................... 119/459, 464, 119/467, 482, 474, 498, 52.2, 52.1, 52.3, 430, 708

[56] References Cited

U.S. PATENT DOCUMENTS

| | | | |
|---|---|---|---|
| 3,381,663 | 5/1968 | Dayton | 119/467 |
| 3,712,267 | 1/1973 | Moliterni | 119/467 X |
| 4,384,547 | 5/1983 | Mattox | 119/464 |
| 4,576,116 | 3/1986 | Binkert | 119/708 |
| 5,199,379 | 4/1993 | Brown | 119/459 |
| 5,474,031 | 12/1995 | David et al. | 119/708 |
| 5,577,465 | 11/1996 | Cook | 119/498 |

*Primary Examiner*—Thomas Price
*Attorney, Agent, or Firm*—Douglass F. Vincent

[57] ABSTRACT

A seclusion compartment for a pet has a floor, an upper plate, and a tent pole for separating and attaching the floor and the upper plate. A flexible opaque covering is attached to the floor and the upper plate to form a substantially enclosed compartment for the pet. The compartment may be attached to the inside of a pet cage, as by a nut and bolt. Ideally, the compartment is attached to the ceiling of the pet cage, so that it is suspended therefrom. An elastic band may be used to attach the opaque covering to the floor, and to allow a portion of the covering to be selectively positioned to provide an opening for ingress and egress by the pet. The seclusion compartment thus provides optional privacy for the pet within the confines of the pet's usual cage.

6 Claims, 2 Drawing Sheets

BIRD SLEEPER

Technical Field

This invention relates to bird cages, and more particularly to a seclusion compartment for birds for use within a conventional bird cage.

BACKGROUND ART

Parrots and other exotic birds are very popular as pets. When kept as pets, these birds are most commonly housed in conventional wire cages, in which the birds may be easily viewed. However, the birds are instinctively motivated to seek seclusion for a variety of activities such as eating, sleeping, playing with chew-toys and the like. The typical wire bird cage is not well suited to provide seclusion for the bird but rather allows the bird to be seen at all times. This problem has typically been solved by placing a cover over the cage periodically, usually at night when the bird sleeps. However, this is only a partial solution to the problem at best. With this solution, the bird still does not have a choice to be secluded when it feels the need. Additionally, this approach requires regular action by the pet owner to ensure that the bird's seclusion needs are properly taken care of. Besides requiring an additional task on the part of the owner, this method fails if the owner forgets to attend to the required chore, and is completely unsuited to situations where the owner is not at home for an extended period.

On the other hand, the cage could be left covered at all times. This would clearly solve the seclusion problem. However, the birds also like to be in an open area most of the time, and would thus be averse to this solution. In addition, the owners like to see and communicate with their birds, and a constantly covered cage would impair that possibility.

What is needed, therefore, is a structure which would allow a bird to seek seclusion as it feels the need. The structure should also permit the bird to choose to be in an open space, to satisfy both the bird and the bird's owner. Ideally, the structure would be adaptable to fit in an existing bird cage, to minimize the expense and inconvenience to the owner.

DISCLOSURE OF THE INVENTION

In accordance with this invention a seclusion compartment for a pet bird is provided. The compartment includes a floor, an upper plate, and rigid means for separating and connecting the floor and the upper plate. Preferably, the rigid means would be a tent pole connected to both the plate and the floor and located approximately in the center of each. An opaque flexible covering is wrapped around the structure formed by the floor, the plate, and the tent pole, forming an enclosed private compartment for the bird capable of fitting within a conventional bird cage. Typically, the flexible covering would be cotton, nylon, or other easily cleaned material.

Optionally, an elastic band may be provided at the base of the flexible covering, surrounding the floor. This elastic band allows the covering to be positioned to provide various sizes of openings for the bird to enter and exit the compartment. Attaching means, such as a nut and bolt, may also be provided for attaching the compartment to the inside of the cage. Preferably, the attaching means would connect the upper plate to the top of the bird cage, thereby suspending the compartment from the top of the cage.

Alternatively, the tent pole may be replaced by rigid sides connecting the upper plate to the floor. The rigid sides could be of a transparent material such as plexiglass. However, the compartment would then also require an opaque covering as in the preferred embodiment.

Based on the foregoing, several advantages of the present invention are readily apparent. A light, compact seclusion compartment is provided which allows a pet bird to seek seclusion as desired. The bird takes care of its own needs for seclusion as they arise, without the need for intervention by its owner. When not in seclusion, the bird is free to roam its cage in the usual fashion. Finally, the compartment is capable of being retrofitted to conventional bird cages, thus avoiding needless expense and inconvenience.

Additional advantages of this invention will become apparent from the description which follows, taken in conjunction with the accompanying drawings.

BEST MODE FOR CARRYING OUT THE INVENTION

Figure 1:
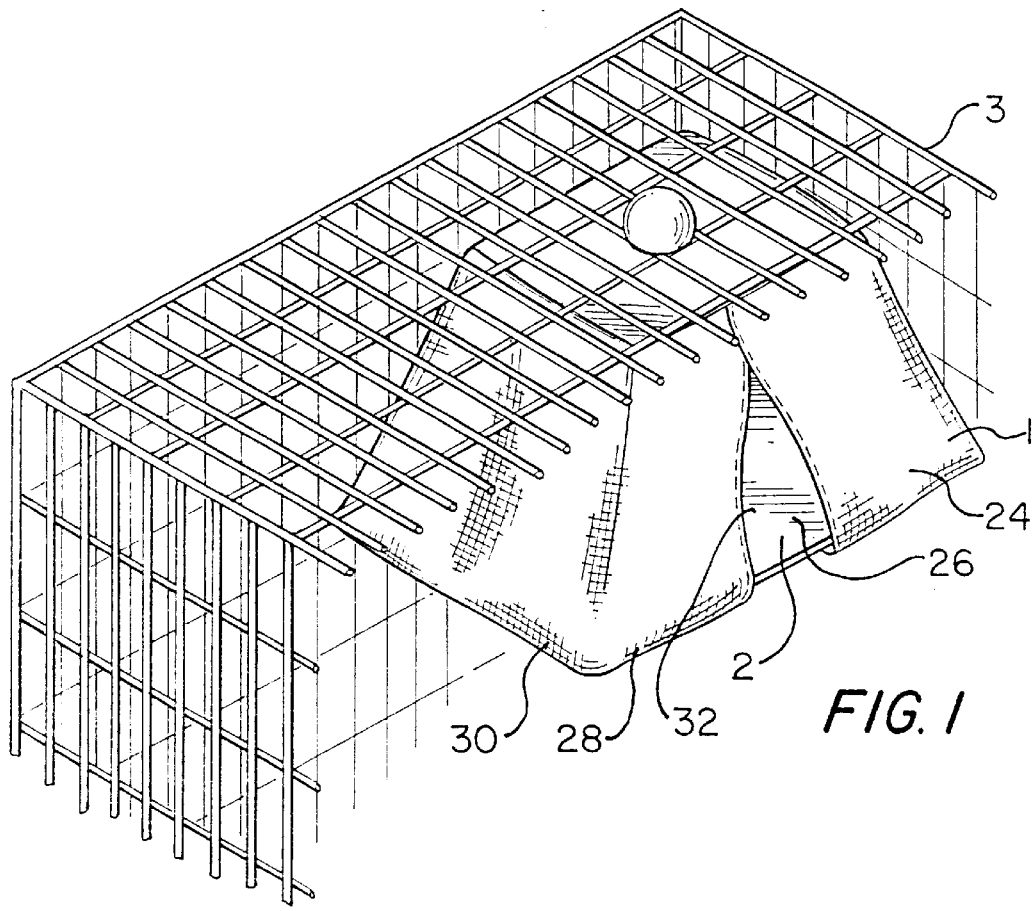
FIG. 1 is a perspective view of the bird seclusion compartment of the present invention attached to the ceiling of a conventional bird cage.
Figure 2:
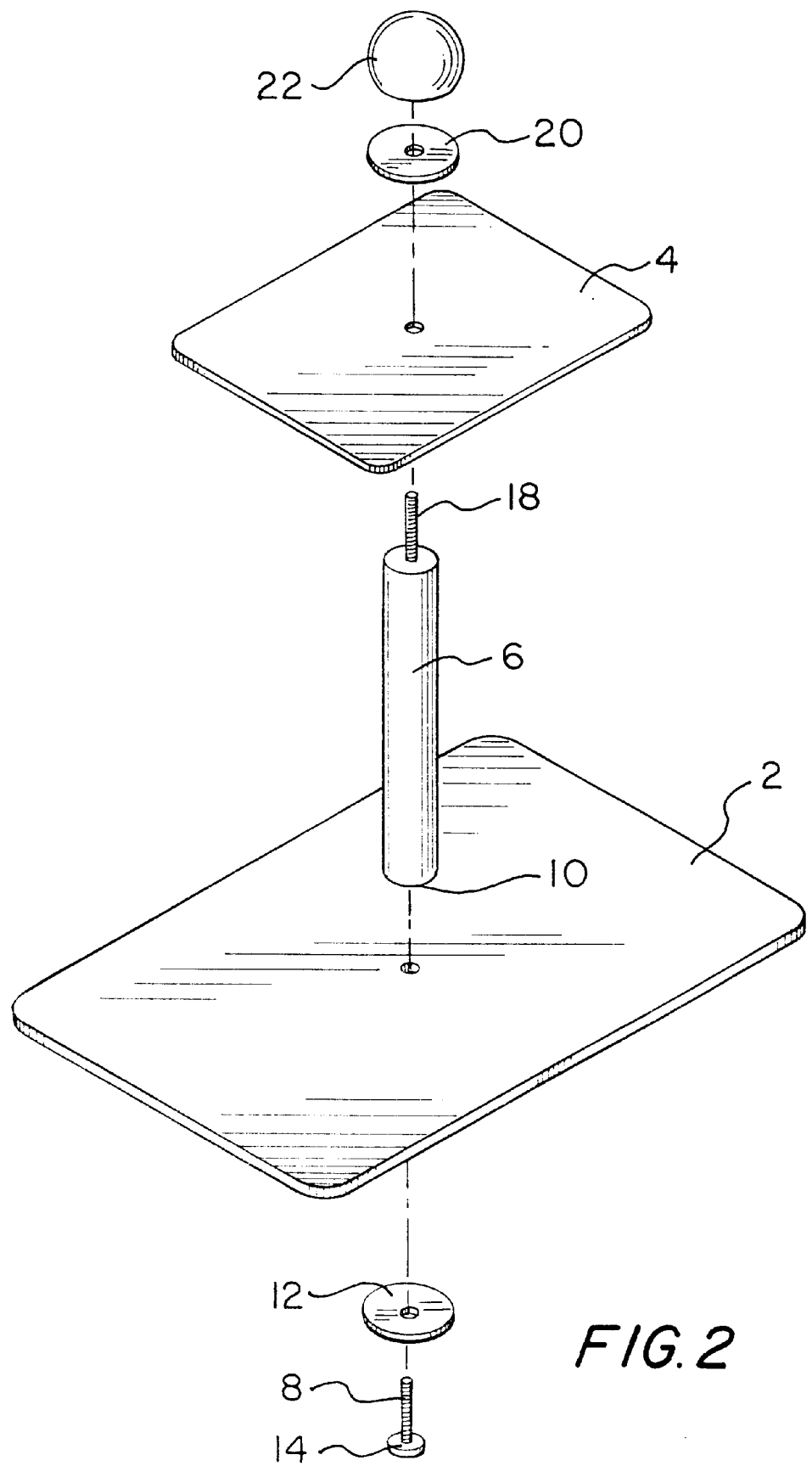
FIG. 2 is an exploded view of the framework of the seclusion compartment of FIG. 1, showing the orientation of the various parts.

Referring now to FIGS. 1 and 2, there is shown a seclusion compartment 1 for a pet bird, suitable for use in a conventional bird cage 3. The compartment 1 has a floor 2 and an upper plate 4 which doubles as a ceiling. Ideally, the floor 2 and upper plate 4 are connected by a rigid column 6, which acts as a tent pole. The column 6 has a bolt 8 at its lower end 10, with the bolt 8 connecting through a washer 12 to a nut 14. At the upper end 16 of the column 6, a second bolt 18 protrudes from the column 6, and is attached through a washer 20 to a decorative nut 22. As best seen in FIG. 1, the nut 22 is positioned outside of the bird cage 3 so that when the nut 22 is screwed onto bolt 8, the compartment 1 is suspended from the top of the cage 3. Of course, the compartment 1 could be suspended from any side of the bird cage 3, but it is most convenient and decorative to suspend the compartment 1 from the top of the cage 3. In fact, suspension is optional, and the compartment could simply rest on the floor of the cage 3.

A flexible covering 24 is wrapped around the floor 2 and the upper plate 4 to form a tent-like enclosed space 26 for the pet bird. The covering 24 must be at least substantially opaque, and preferably entirely opaque, to provide the desired seclusion for the bird. Typically, the covering 24 would be cotton or nylon construction for ease of cleaning, and may also have a decorative print. Optionally, an elastic band 28 may be provided at the base 30 of the flexible covering 24 surrounding the floor 2. This elastic band 28 allows the covering 24 to be positioned to provide an opening 32 of various sizes for the bird to enter and exit the compartment 1.

Figure 3:
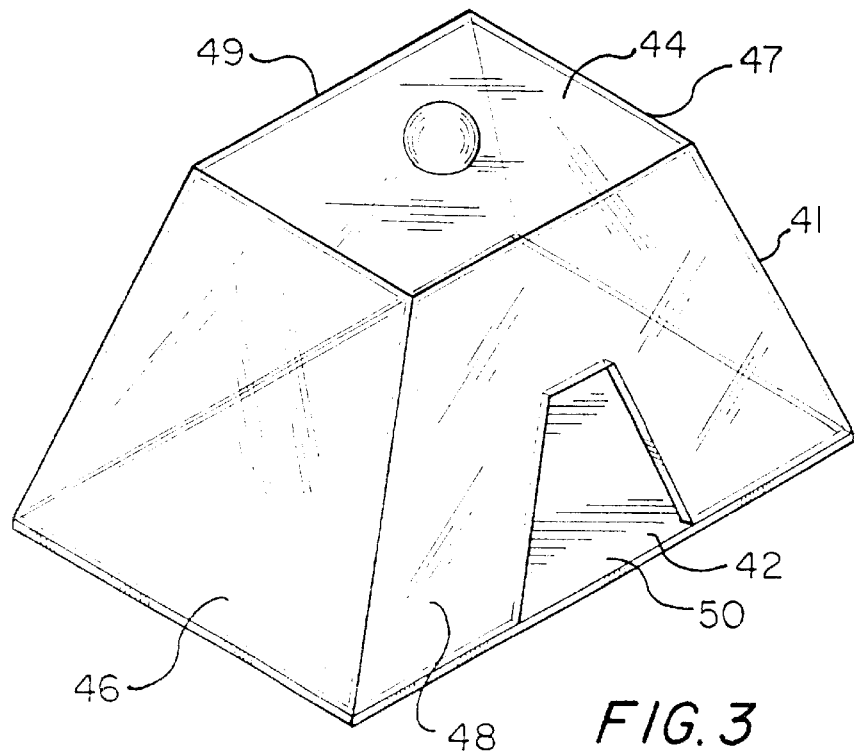
FIG. 3 is an alternative embodiment of the present invention utilizing rigid sides instead of a center column to connect the floor and the upper plate.

Referring now to FIG. 3, an alternative embodiment of the present invention is shown. The compartment 41 once again includes a floor 42 and an upper plate 44. However, in this embodiment, rigid sides 46,47,48, and 49 are shown connecting the floor 2 and the upper plate 44. A door 50 is provided to allow ingress and egress by the bird. As shown in FIG. 3, the sides 46 through 49, the floor 42, and the upper plate 44 are all constructed of a transparent material, such as glass or plexiglass. This would facilitate cleaning, but would require a flexible covering also be utilized to provide seclusion as in the embodiment of FIG. 1. Optimally, an opaque material could be used to construct the sides 46,47,48, and 49, and top 44 of compartment 41, thereby dispensing with the need for a covering.

Finally, while this invention is particularly well suited for use by pet birds, other small pets might also benefit from the use of such a device. Notably, snakes, reptiles, hamsters, ferrets and the like also need seclusion at times, and find the present device attractive for that purpose.

This invention has been described in detail with reference to a particular embodiment thereof, but it will be understood that various other modifications can be effected within the spirit and scope of this invention.

I claim:

1. A seclusion compartment for a pet, comprising:

a floor;

an upper plate;

rigid means for separating and attaching said floor and said upper plate;

a flexible opaque covering attached to said floor and said upper plate to form a substantially enclosed compartment for the pet; and means for attaching said compartment to the inside of a pet cage.

2. A seclusion compartment for a pet as claimed in claim 1, wherein:

said attachment means attaches said compartment to the ceiling of said pet cage, so that the compartment is suspended therefrom.

3. A seclusion compartment for a pet, comprising:

a floor;

an upper plate;

rigid means for separating and attaching said floor and said upper plate;

a flexible opaque covering attached to said floor and said upper plate to form a substantially enclosed compartment for the pet; and elastic means for attaching said opaque covering to said floor, and to allow a portion of said covering to be selectively positioned to provide an opening for ingress and egress by said pet.

4. A seclusion compartment for a pet, comprising:

a floor;

an upper plate;

rigid means for separating and attaching said floor and said upper plate;

a flexible opaque covering attached to said floor and said upper plate to form a substantially enclosed compartment for the pet; and means for attaching said compartment to the inside of a pet cage.

5. A seclusion compartment as claimed in claim 4, further including:

elastic means for attaching said opaque covering to said floor, and to allow a portion of said covering to be selectively positioned to provide an opening for ingress and egress by said pet.

6. A seclusion compartment as claimed in claim 4, wherein:

said rigid means is a tent pole extending from said floor to said upper plate; and said attachment means attaches said compartment to the ceiling of said cage, so that the compartment is suspended therefrom.

* * * * *